(No Model.) 3 Sheets—Sheet 1.
H. S. ELWORTHY.
APPARATUS FOR SOLIDIFYING CARBON DIOXID.
No. 579,866. Patented Mar. 30, 1897.
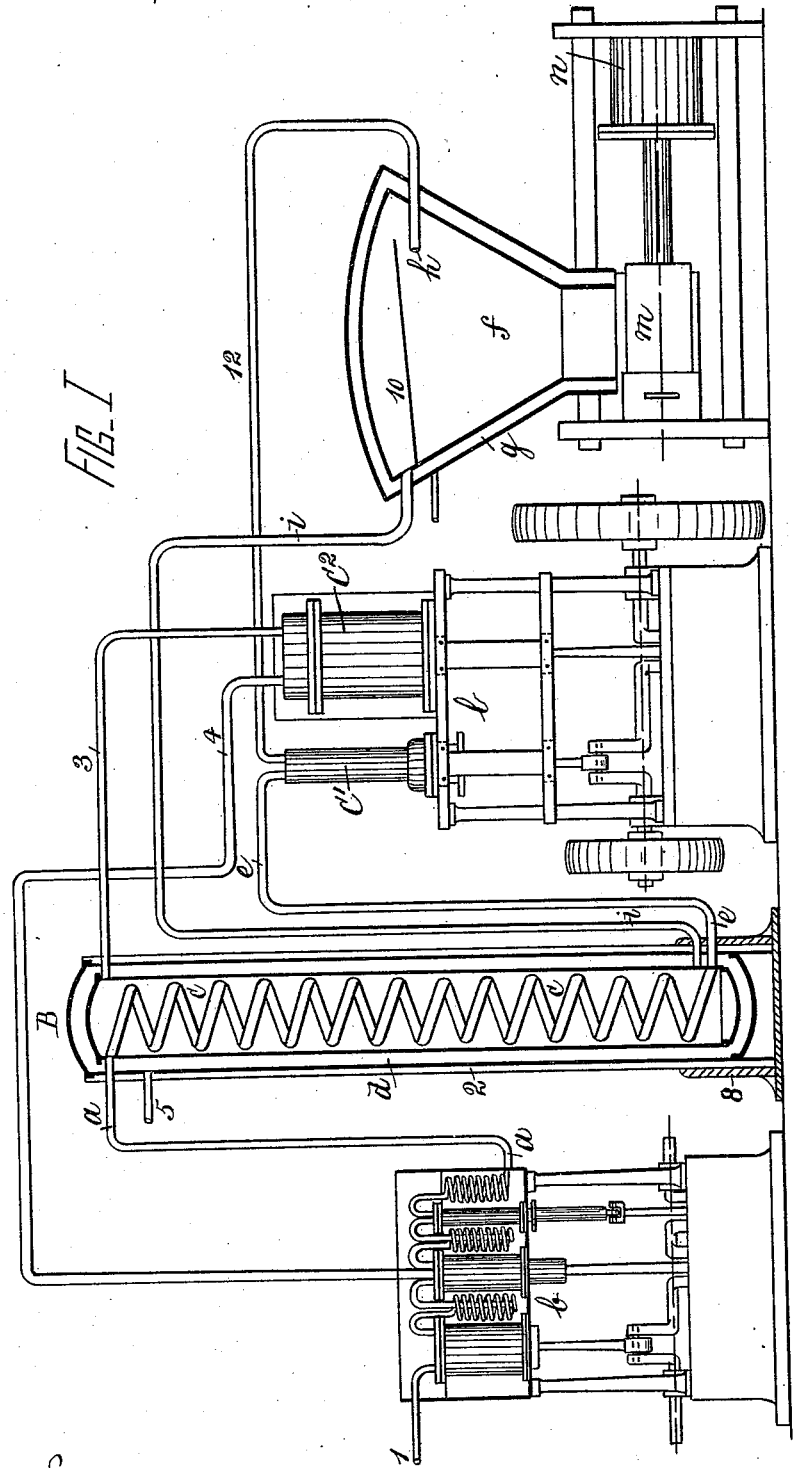
FIG. I (No Model.) 3 Sheets—Sheet 2.
H. S. ELWORTHY.
APPARATUS FOR SOLIDIFYING CARBON DIOXID.
No. 579,866. Patented Mar. 30, 1897.
FIG. II
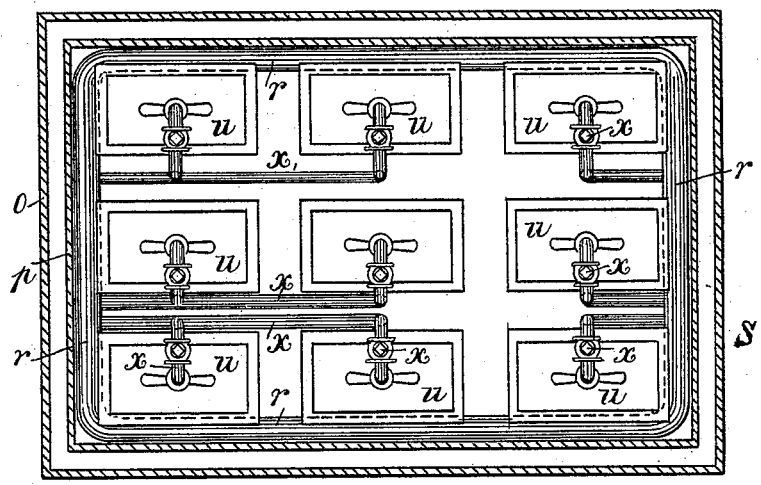
FIG. III
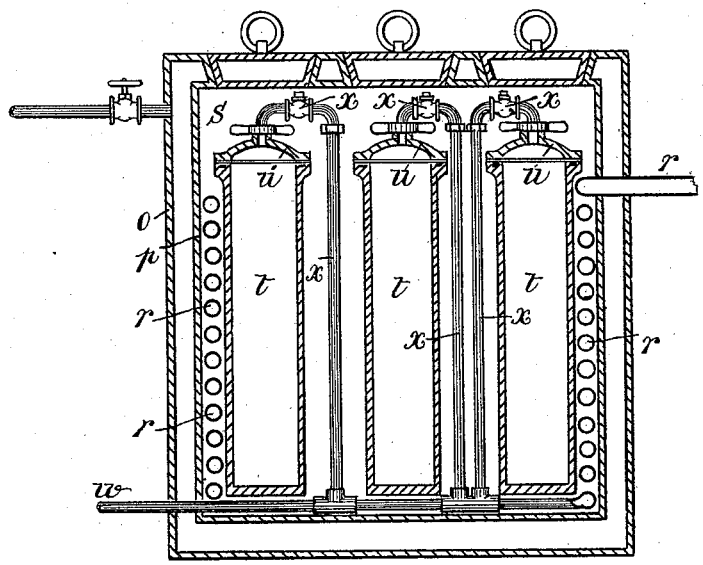

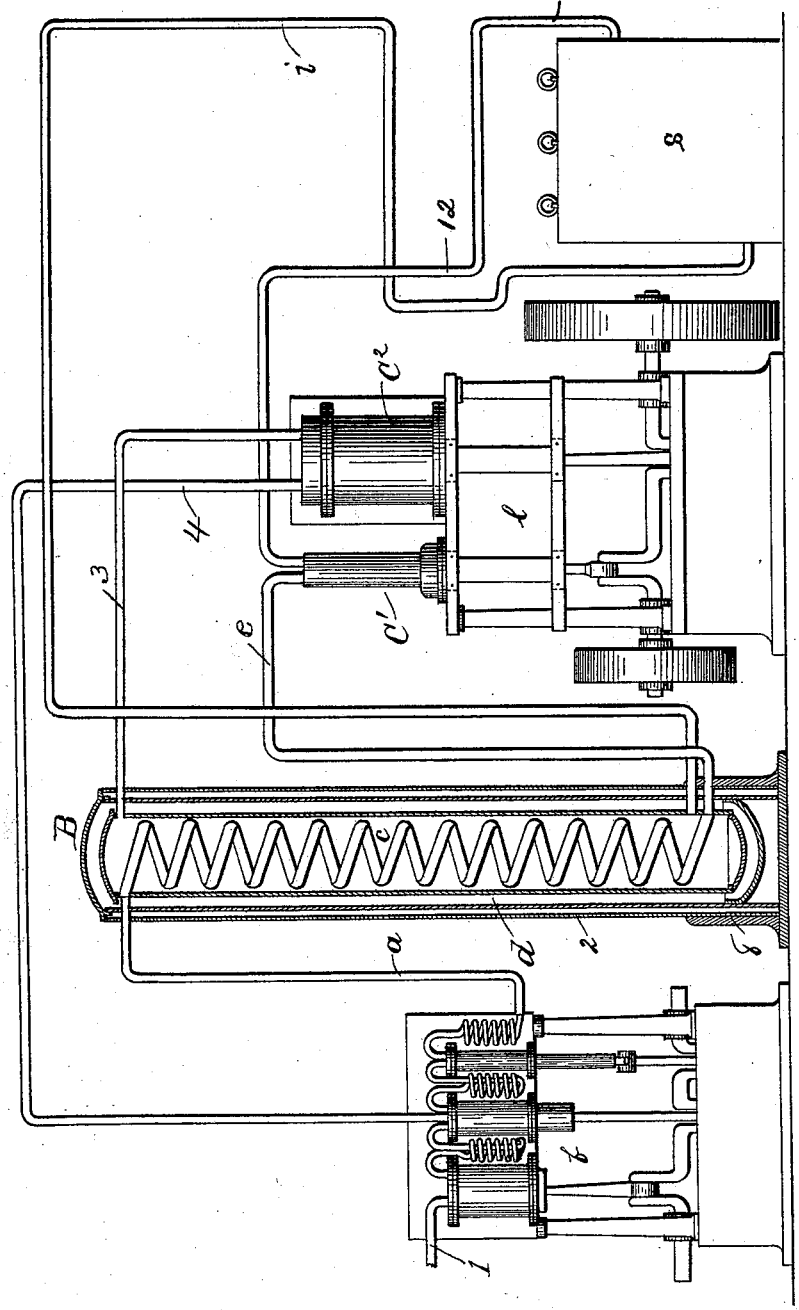

ably connected to the intermediate cylinder
UNITED STATES PATENT OFFICE.

HERBERT SAMUEL ELWORTHY, OF BANDRA, INDIA.

APPARATUS FOR SOLIDIFYING CARBON DIOXID.

SPECIFICATION forming part of Letters Patent No. 579,866, dated March 30, 1897.

Application filed September 20, 1895. Serial No. 563,120. (No model.)

*To all whom it may concern:*

Be it known that I, HERBERT SAMUEL ELWORTHY, a subject of the Queen of Great Britain, residing at Bandra, Bombay, in the Empire of India, have invented certain new and useful Improvements in the Method of Solidifying and Utilizing Carbon Dioxid, of which the following is a specification.

My invention relates to an improvement in the process of solidifying liquefied carbon dioxid, or so-called "carbonic-acid gas;" and it also relates to certain novel apparatus by which the process of solidifying the aforesaid gas is carried out, rendering the liquefied carbon dioxid in such form as to obviate the use of heavy iron and steel vessels at present used in transporting the gas, and when transported to be applied to a variety of purposes hitherto attended with much trouble and inconvenience.

To more fully describe my invention, reference is had to the accompanying drawings of the apparatus for carrying out the aforesaid improved process, in which—

Figure 1 represents in side elevation, partly in section, the several parts of the complete apparatus for solidifying carbon dioxid, consisting of a stage-compressor, regenerative refrigerating apparatus, a double-cylinder motor-pump, a solidifying-chamber, and a hydraulic compressor. Fig. 2 represents a horizontal section of a spirit-tank containing solidifying-boxes and piping, shown in plan, all of which may be substituted for the solidifying-chamber shown in Fig. 1. Fig. 3 represents a vertical cross-section through the apparatus shown in Fig. 2. Fig. 4 represents the compressor, regenerative device, and expansion-engine shown in Fig. 1 connected with the modified form of solidifying device as shown in Figs. 2 and 3.

Similar letters and numerals refer to similar parts throughout the several views.

The carbon dioxid is converted into a solid form either by first converting it into "carbonic-acid snow" and compressing that into blocks more or less solid, or by freezing the liquefied gas direct to a condition resembling ordinary ice. In order to carry out the first process—namely, converting the gas into "snow"—the gas-reservoir is connected by means of the pipe 1 to the stage-compressor $b$, which is the ordinary form of compressor now in general use for liquefying or highly compressing gases.

The gas passes into the first or largest cylinder of the compressor, whence, after passing through the cooling-coils and the other cylinders in succession, it passes away in a liquefied state via the pipe $a$ to the regenerative refrigerating apparatus B. This regenerative refrigerating apparatus B consists of a double-walled vertical or horizontal vessel. This vessel may have an outer non-conducting covering 2, of any suitable material, and has between its double walls a space $d$, which is exhausted in as complete a manner as possible, thus forming a vacuum-jacket. Inside the refrigerating vessel the coil of pipe $c$ is placed. The vessel is fitted into the base 8, and any spaces may be filled with non-conducting material. The vacuum-jacket is exhausted through the pipe 5, which is afterward closed by any suitable means. The liquefied gas coming from the compressor enters the coil $c$ through the pipe $a$, and after passing through said coil is carried away by pipe $e$ to the motor-pump cylinder $C'$, whence it passes by pipe 12 to the chamber $f$. That portion of the gas which remains unsolidified in the solidifying-chamber $f$, Fig. 1, returns through the pipe $i$, and passing through the regenerative refrigerator round the outside of the coil $c$ goes away by pipe 3 to cylinder $C^2$ of the combined motor-pump $l$, where it is partially compressed by means of the expansion of another portion of liquefied carbon dioxid in the cylinder $C'$, and is then returned to the compressor $b$ by pipe 4, the latter being preferably connected to the intermediate cylinder of the compressor.

In the motor-pump $l$ (shown in outline in Fig. 1) the liquefied gas coming from the regenerative refrigerator-coil $c$ first enters cylinder $C'$, where by its expansion it drives the motor and pump and is itself very greatly cooled in the operation, after which it is exhausted into the solidifying-chamber $f$, where it becomes partially solidified into the form of snow. The unsolidified gas first returns to the regenerative refrigerator to cool the liquefied gas, and thence back again to cylinder C² of the motor-pump, where after being partially compressed it is returned to the compressor, as above described.

f is the double-walled solidifying-chamber, also vacuum-jacketed, as at g. The bottom of the chamber is preferably made tapering or funnel-shaped, as shown, and leads direct into a hydraulic press. The snow formed in the chamber accumulates at the bottom thereof, and the ram or platen of the press compresses the snow thus formed into the removable box at m. The hydraulic press may, however, be entirely separate, and the snow being removed from the bottom of the solidifying-chamber by any suitable means may then be placed in the box and compressed in the usual way. When the box at m is full, it may be removed and another be put in its place, and the slab of compressed snow may then be taken out. The baffle-plate 10 serves to prevent the pipe i being choked by particles of the snow being carried along with the escaping gas.

Instead of using the solidifying-chamber and press shown in Fig. 1 the apparatus shown in Figs. 2, 3, and 4 may be substituted. In this case the pipe 12, conveying the liquefied carbon dioxid from the cylinder C', may be connected direct to the coil-pipe r, which pipe is most clearly shown in Figs. 2 and 3.

This liquefied carbon dioxid is run through the coil of pipe r, immersed in a tank s, containing methylated alcohol or pure alcohol, the tank being made, preferably, with double walls o and p and vacuum-jacketed, as above described. The carbon dioxid is allowed to expand in the coil of pipe down to about five or ten atmospheres, and in doing so the spirit in the tank s is cooled down to a very low temperature. In the tank are placed a number of covered metallic cylinders or boxes t or other suitable vessels with air-tight covers, and a part of the gas from the pipes is allowed to flow into these boxes by the valves x, where upon the expansion of a portion of the said liquefied gas the remainder is solidified. The unsolidified gas remaining in the pipe r after another portion has been admitted to the tanks and become solid is returned to the compressor through the pipe w, which in this case is connected to the pipe i, and the gas is thus sent back for recompression, as described for the foregoing process. When the boxes t have collected a sufficient amount of solid carbon dioxid, they are removed from the spirit-tank, and the pipes x being uncoupled the boxes t are allowed to stand in the air for a few minutes and then opened and the block of ice taken out, which can be readily done, as the walls of the box have become slightly warmed by standing in the air. The boxes are also made slightly tapering for the purpose of facilitating the removal of the ice blocks.

Instead of cooling the spirit in the tank with carbon dioxid any other cooling medium may be used, such, for instance, as air, ammonia, ether, or the so-called "Pictet" fluid, which consists of a mixture of carbon dioxid and sulfur dioxid, and in this case the carbon dioxid is simply compressed into the boxes immersed in the spirit-tank, and any waste is returned by a suitable arrangement of pipes to the compressor or the gas-holder. Any two or more substances may be used for cooling the gas, or it may be partially cooled by its own expansion and further cooled by the action of the other substances.

The solid carbon dioxid, either in the form of snow or broken ice, is compressed into any of the following forms for convenience of manipulation, and thus rendered available for nearly all purposes for which ice is now used, as well as for many other purposes, among which is the manufacture of aerated waters or other beverages without machines of any kind.

The solidified dioxid is compressed by an ordinary press into the form of blocks or slabs, and these blocks or slabs are scored or divided in such a way as to facilitate their being broken up into squares or cubes or tablets or other forms of suitable weight, and their weight and the quantity of gas they will produce at atmospheric pressure is impressed on each block, either at the time of compression or at a subsequent operation. In this way a known weight or volume may be readily broken off and sold or used in an ordinary ice-box. This form of the solid is also useful for providing the gas in the present type of aerating-machines, as any desired quantity can at once be placed in the gas-holder of such a machine, where on volatilization it will be ready for use in the ordinary way.

Instead of compressing it into the form of large slabs or blocks the solidified dioxid may be compressed into thin sheets or slabs, and these slabs may be so constructed that they may be readily broken into sticks, rods, tablets, or other small pieces. For the manufacture of aerated beverages without a machine these pieces are of such a size as to give off the proper quantity of gas to aerate the water in any given bottle. Each of the pieces is stamped with the weight or volumes of gas of which it consists and also the size of the bottle which it will aerate. By simply dropping one of these pieces into a bottle of water and shaking it by hand or by any convenient way the water will almost immediately become impregnated with the gas. In this way the aerating-machine with all its complications is completely done away with. By the use in this way of solidified gas all danger from bursting storage vessels is done away with and also the large amount of freight now paid for the transportation of these vessels, the weight of which is from two and one-half to three times the weight of the liquefied gas with which they are charged. The solidified gas can be carried in simple felt bags or bags of other non-conducting material. It can also be stored or transported in an ordinary ice-box.

By the improved means of preparing and transporting solidified carbon dioxid this material will be rendered available for all or nearly all purposes for which ice is now used, as well as for any other purposes for which ice is unsuitable. By placing a small quantity of solidified gas in a small box, preferably made of silver or aluminium, and which box may also contain ether or alcohol, and immersing the box in any liquid or solution the latter may be cooled without contact with the gas, and in this way the delicate bouquet of wines and other liquors is preserved.

What I claim as my invention, and desire to secure by Letters Patent of the United States, is—

The apparatus for solidifying carbon dioxid which consists of a compressor having a series of cylinders arranged for serial compression, a regenerative refrigerator with a pipe connecting the same with the last of the series of compression-cylinders, an expansion-engine operating a compression-cylinder and having its expansion-cylinder connected by a pipe with said regenerative refrigerator, an enlarged funnel-shaped vacuum-jacketed chamber connected with the exhaust from the expansion-cylinder of said engine, a baffle-plate extending across the upper portion of said chamber, an opening for the solidified gas in the bottom of said chamber, a compressor communicating with the opening in the bottom of said chamber for pressing the said solid carbon dioxid, a pipe connecting the top of said chamber above said baffle-plate with the said regenerative refrigerator, said refrigerator connected to the compression-cylinder of said expansion-engine, and the exhaust from said cylinder connected with one of the cylinders of the said serial compressor, substantially as described.

In testimony whereof I have hereunto set my hand in the presence of two witnesses.

HERBERT SAMUEL ELWORTHY.

Witnesses:
 EDWIN R. SMETHAM,
 HORMUSPIE JAMASPIE.